(12) United States Patent
Norris

(10) Patent No.: US 9,790,859 B2
(45) Date of Patent: Oct. 17, 2017

(54) GAS TURBINE ENGINE VAPOR COOLED CENTRIFUGAL IMPELLER

(71) Applicant: United Technologies Corporation, Hartford, CT (US)

(72) Inventor: James W. Norris, Lebanon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 222 days.

(21) Appl. No.: 14/524,736

(22) Filed: Oct. 27, 2014

(65) Prior Publication Data

US 2015/0308342 A1 Oct. 29, 2015

Related U.S. Application Data

(60) Provisional application No. 61/906,619, filed on Nov. 20, 2013.

(51) Int. Cl.

| F02D 1/00 | (2006.01) |
| F02C 7/16 | (2006.01) |
| F01D 5/08 | (2006.01) |
| F04D 29/28 | (2006.01) |
| F04D 29/58 | (2006.01) |

(52) U.S. Cl.
CPC .............. F02C 7/16 (2013.01); F01D 5/088 (2013.01); F04D 29/285 (2013.01); F04D 29/584 (2013.01); F05D 2260/207 (2013.01); F05D 2260/2322 (2013.01)

(58) Field of Classification Search
CPC .......... F01D 1/02; F01D 25/125; F01D 25/16; F01D 5/025; F01D 5/088; F01D 5/181; F01D 5/185; F01D 5/187; F02C 3/04; F02C 7/16; F05D 2220/32; F05D 2240/24; F05D 2240/55; F05D 2260/2322; F05D 2260/207; F04D 29/285; F04D 29/584

See application file for complete search history.

(56) References Cited

U.S. PATENT DOCUMENTS

| 1,959,703 | A | * | 5/1934 | Birmann | F01D 5/048 415/115 |
| 2,778,601 | A | * | 1/1957 | Eckert | F01D 5/185 415/114 |
| 2,883,151 | A | * | 4/1959 | Dolida | F01D 5/088 165/104.25 |
| 2,992,529 | A | * | 7/1961 | Sampietro | F02C 7/16 60/728 |
| 5,299,418 | A | | 4/1994 | Kerrebrock | |
| 5,537,814 | A | * | 7/1996 | Nastuk | F01D 5/066 60/796 |

(Continued)

OTHER PUBLICATIONS

U.S. Appl. No. 61/915,272, filed Dec. 12, 2013 Titled: Gas Turbine Engine Compressor Rotor Vaporization Cooling.

*Primary Examiner* — Pascal M Bui Pho
*Assistant Examiner* — Kyle Thomas
(74) *Attorney, Agent, or Firm* — Carlson, Gaskey & Olds, P.C.

(57) ABSTRACT

A gas turbine engine radial impeller includes first and second impeller portions that are secured to one another along a neutral bending plane of the radial impeller. A vapor cooling cavity is provided between the first and second impeller portions. The neutral bending plane is arranged in the vapor cooling cavity.

17 Claims, 1 Drawing Sheet

(56) References Cited

U.S. PATENT DOCUMENTS

| | | | |
|---|---|---|---|
| 6,192,670 B1 | 2/2001 | Kerrebrock | |
| 6,351,938 B1* | 3/2002 | Kerrebrock | F01D 5/046 60/806 |
| 6,499,953 B1* | 12/2002 | Bellerose | F04D 29/285 416/175 |
| 6,672,075 B1* | 1/2004 | Sandu | F01D 5/088 415/114 |
| 8,057,163 B2 | 11/2011 | Thompson, Jr. et al. | |
| 2007/0224047 A1* | 9/2007 | Falk | F04D 29/284 416/97 R |
| 2007/0237646 A1* | 10/2007 | Shi | F01D 5/025 416/244 A |
| 2014/0150449 A1* | 6/2014 | Watson | F01D 5/026 60/785 |

* cited by examiner

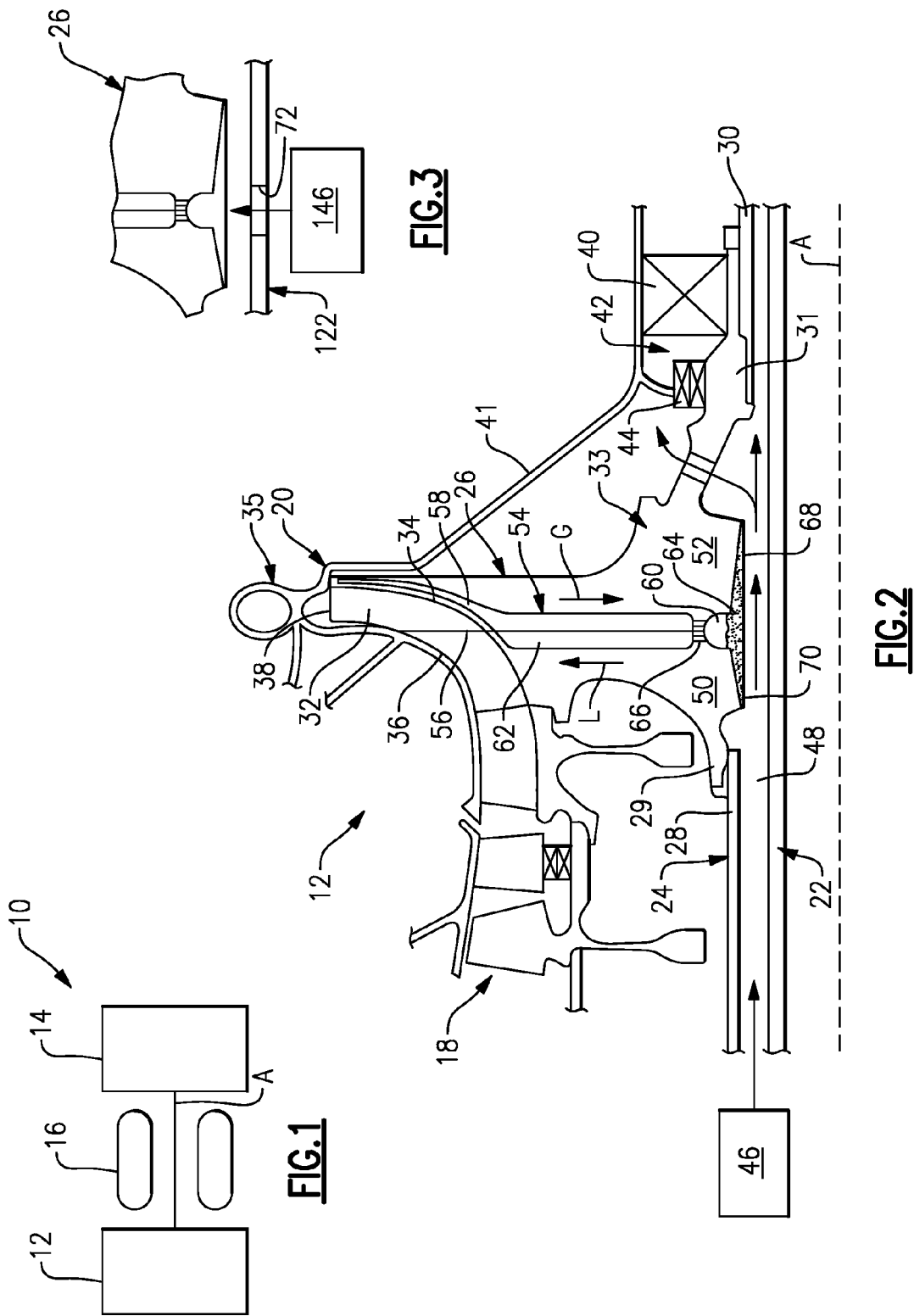

GAS TURBINE ENGINE VAPOR COOLED CENTRIFUGAL IMPELLER

CROSS-REFERENCE TO RELATED APPLICATIONS

This application claims priority to U.S. Provisional Application No. 61/906,619, which was filed on Nov. 20, 2013 and is incorporated herein by reference.

BACKGROUND

This disclosure relates to a gas turbine engine radial impeller. More particularly, the disclosure relates to a configuration for cooling the radial impeller using vapor cooling.

A gas turbine engine uses a compressor section that compresses air. The compressed air is provided to a combustor where the compressed air and fuel is mixed and burned. The hot combustion gases pass over a turbine to provide work that may be used for thrust or driving another system component.

Gas turbine engines continue to get smaller as pressure ratios are increased in an effort to improve fuel burn. Axial compressors typically lose their efficiency as they become smaller such that the use of radial impellers becomes more attractive for compact gas turbine engines.

Radial impellers are limited in temperature capability due to the thermal gradients between the root and tip of the impeller. A vapor cooling scheme has been proposed to reduce the temperature of the impeller. The radial impeller incorporates a vapor cooling cavity having a phase change material that changes phase between a liquid and a gas to provide cooling to the impeller tip. The proposed designs have not been practical in terms of operability or manufacturability.

SUMMARY

In one exemplary embodiment, a gas turbine engine radial impeller includes first and second impeller portions that are secured to one another along a neutral bending plane of the radial impeller. A vapor cooling cavity is provided between the first and second impeller portions. The neutral bending plane is arranged in the vapor cooling cavity.

In a further embodiment of the above, a vane is secured to an impeller body. The neutral bending plane extends through the vane. First and second vane portions are secured to one another at the neutral bending plane.

In a further embodiment of any of the above, the vane includes an inner flow radius that is arranged at the impeller body and an outer flow radius opposite the inner flow radius. The vane has a trailing edge interconnecting the inner and outer flow radii. The neutral bending plane is axially forward the trailing edge.

In a further embodiment of any of the above, a thermal barrier coating is arranged on the vane.

In a further embodiment of any of the above, the vapor cooling cavity includes radially inner and outer chambers fluidly interconnected to one another by a passageway. The vapor cooling cavity has a phase change material that is configured to transition from a liquid to a gas during engine operation, and the phase change material is configured to transition from a gas to a liquid during engine operation.

In a further embodiment of any of the above, a vane is secured to an impeller body. The vapor cooling cavity includes an outer chamber that is arranged axially beneath the vane without extending into the vane.

In a further embodiment of any of the above, the passageway is axially wider than the outer chamber.

In a further embodiment of any of the above, the inner chamber is axially wider than the passageway and the outer chamber.

In a further embodiment of any of the above, the passageway is connected to the inner chamber at an intermediate location.

In a further embodiment of any of the above, a wall is secured to the radial impeller to provide the inner chamber.

In a further embodiment of any of the above, a radially extending slot fluidly connects the passageway to the inner chamber.

In a further embodiment of any of the above, the radial impeller includes forward and aft axial clamping features. The inner chamber is provided axially between the forward and aft axial clamping features.

In another exemplary embodiment, a gas turbine engine compressor section includes a radially impeller mounted to a shaft. The radial impeller includes a vapor cooling cavity that has inner and outer chambers fluidly connected by a passageway. The inner chamber is arranged at an inner diameter of the radial impeller. The inner diameter is in fluid communication with a cooling flow path within the shaft.

In a further embodiment of the above, the shaft is supported for rotation by a bearing that is arranged in a bearing compartment that is sealed by an air seal. The cooling flow path is in fluid communication with the air seal to buffer the bearing compartment.

In a further embodiment of any of the above, the shaft is an outer shaft and comprises an inner shaft disposed within the outer shaft. The inner and outer shafts provide an annular space that provides the cooling flow path.

In a further embodiment of any of the above, the shaft is an outer shaft and comprises an inner shaft disposed within the outer shaft. The inner shaft includes an aperture that is arranged radially beneath the inner chamber. The cooling flow path extends from within the inner shaft and through the aperture.

In a further embodiment of any of the above, an axial compressor stage is arranged upstream from the radial impeller. A combustor section and a turbine section are arranged downstream from the radial impeller. The axial compressor stage is configured to provide a cooling flow to the inner diameter.

In a further embodiment of any of the above, the radial impeller is clamped between the first and second shaft portions that provide the shaft.

In a further embodiment of any of the above, the axial compressor stage is in fluid communication with the cooling flow path.

In a further embodiment of any of the above, the radial impeller includes first and second impeller portions that are secured to one another along a neutral bending plane of the radial impeller. The vapor cooling cavity is provided between the first and second impeller portions. The neutral bending plane is arranged in the vapor cooling cavity. The radial impeller has a vane that is secured to an impeller body. The vapor cooling cavity includes an outer chamber that is arranged axially beneath the vane without extending into the vane.

BRIEF DESCRIPTION OF THE DRAWINGS

The disclosure can be further understood by reference to the following detailed description when considered in connection with the accompanying drawings wherein:

FIG. 1 is a highly schematic view of a gas turbine engine.

FIG. 2 is a schematic view of a compressor section of a gas turbine engine with one example cooling flow for a radial impeller.

FIG. 3 is a schematic view of another example cooling flow for the radial impeller.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

A gas turbine engine 10 is schematically depicted in FIG. 1. The engine 10 includes a compressor section 12 coupled to a turbine section 14, which are together rotatable about an axis A. A combustor section 16 is provided axially between the compressor and turbine sections 12, 14.

One example of compressor section 12 is shown in more detail in FIG. 2. The compressor section 12 includes one or more axial compressors stages 18 upstream from a radial compressor stage 20. Depending upon the design of the engine 10, the compressor and turbine sections 12, 14 may be mounted on one or more shafts. In the example shown in FIG. 2, inner and outer shafts 22, 24 are coaxial with one another and rotatable about a common axis A.

The radial compressor stage 20 includes a radial impeller 26 having forward and aft clamping features 29, 31 that are retained between first and second shaft portions 28, 30 of the outer shaft 24.

The radial impeller 26 includes a circumferential array of vanes 32 mounted to an impeller body 33. Each vane 32 is provided by inner and outer flow radii 34, 36 joined to one another at a trailing edge 38 from which compressed gases exit to a diffuser 35.

The radial impeller 26 is supported for rotation about the axis A by a bearing 40 mounted with respect to a housing 41. The bearing 40 is arranged within a bearing compartment 42 that is sealed by an air seal 44. A cooling source 46 provides pressurized fluid to an area adjacent to the air seal 44 opposite the bearing 40 to buffer the bearing compartment 42. An annular space 48 is provided between the inner and outer shafts 22, 24. The annular space 48 fluidly connects the cooling source 46 to the air seal 44 in the example. The cooling source 46 is compressed air from an axial compressor stage 18 upstream from the radial compressor stage 20, for example.

In one example, the radial impeller 26 is provided by first and second impeller portions 50, 52 that are secured to one another. The radial impeller 26 may be forged or cast and then subsequently machined. In one example, the first and second impeller portions are secured to one another by lateral friction welding, for example. The radial impeller 26 may also be additively manufactured, if desired.

As the radial impeller 26 rotates at high speeds about the axis A, the impeller bends along a radially extending neutral bending plane 56. The neutral bending plane 56 is axially forward of the trialing edge 38. To maintain the structural integrity of the radial impeller 26, the first and second impeller portions 50, 52 are secured to one another at or near the neutral bending plane 56.

A vapor cooling cavity 54 is provided between the first and second impeller portions 50, 52 and includes a phase change material 64. The neutral bending plane 56 is arranged in the vapor cooling cavity 54 such that the cavity may be more easily manufactured using line of sight manufacturing techniques.

The vapor cooling cavity 54 includes an outer chamber 58 that is arranged axially beneath the vane 32. In the example, the outer chamber 58 does not extend into the vane 32 so that the structural integrity of the vane 32 is not compromised and the first and second portions may be secured at the neutral bending plane 56. A thermal barrier coating may be applied to each of the vanes 32 to limit the temperatures to which the vane 32 is exposed. Using a thermal barrier coating may prevent the vapor cooling material from being overloaded. If the vane is not insulated somewhat from heat and too much heat goes into the radial impeller, the vapor cooling material may not be able to cool sufficiently and condense to a liquid.

An inner chamber 60 is provided at a radial innermost portion of the radial impeller 26. A wall 68, which may be a cylindrical sheet of metal, is secured to the impeller body 33, for example, by welding. The vapor cooling cavity 54 includes a radial extending passageway 62 that fluidly connects the inner and outer chambers 60, 58 to one another. The passageway 62 is axially wider than the outer chamber 58. Radially extending slots 66 are provided in the impeller body 33 and fluidly communicate the phase change material 64 between the passageway 62 and the inner chamber 60. The passageway 62 is fluidly connected to the inner chamber 60 at an axially intermediate location.

The phase change material 64 is configured to change phases between liquid and gaseous phases at desired temperatures during engine operation. In operation, the phase change material 64 in its liquid form is forced radially outward into the outer chamber 58 by centrifugal force. Once sufficient heat has been transferred from the vanes 32 to the phase change material 64 in the outer chamber 58 to reach the evaporation point, the gaseous phase G of the phase change material 64 is conveyed to the inner chamber 60 through the passageway 62 and slots 66. Cooling flow within the annular space 48 passes along an inner diameter 70 of the wall 68, condensing the gases within the inner chamber 60. Once liquefied, the liquid phase L of the phase change material 64 is again transferred to the outer chamber 58 through the slots 66 and passageway 62.

Another cooling configuration is shown in FIG. 3. The cooling source 146 supplies cooling flow through an aperture 72 in the inner shaft 122 beneath the radial impeller 26 to impinge upon the inner chamber.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A radial impeller for a gas turbine comprising:
a vapor cooling passage in which a gaseous and liquid phase coolant flows, wherein the vapor cooling passage is along a neutral bending plane of the radial impeller with the neutral bending plane of the radial impeller passing through a longitudinal axis of a portion of the vapor cooling passage;
an inner chamber in fluid communication with the vapor cooling passage through a plurality of slots formed along the neutral bending plane, wherein the inner chamber is radially inward of the vapor cooling passage so as to provide heat exchange between a gas turbine coolant and the inner chamber.

2. The radial impeller according to claim 1, comprising a vane secured to an impeller body, and the neutral bending plane extends through the vane, first and second vane portions secured to one another at the neutral bending plane.

3. The radial impeller according to claim 2, wherein the vane includes an inner flow radius arranged at the impeller body and an outer flow radius opposite the inner flow radius, the vane has a trailing edge interconnecting the inner and outer flow radii, and the neutral bending plane is axially forward the trailing edge.

4. The radial impeller according to claim 2, comprising a thermal barrier coating arranged on the vane.

5. The radial impeller according to claim 1, comprising a vane secured to an impeller body, and an outer chamber arranged axially beneath the vane without extending into the vane.

6. The radial impeller according to claim 5, wherein the vapor cooling passage is axially wider than the outer chamber.

7. The radial impeller according to claim 5, wherein the inner chamber is axially wider than the vapor cooling passage and the outer chamber.

8. The radial impeller according to claim 1, wherein a wall is secured to the radial impeller to provide an radially innermost surface of the inner chamber.

9. The radial impeller according to claim 1, wherein the radial impeller includes forward and aft axial clamping features, and the inner chamber is provided axially between the forward and aft axial clamping features.

10. A gas turbine engine compressor section comprising:
a radial impeller for a gas turbine comprising:
a vapor cooling passage in which a gaseous and liquid phase coolant flows, wherein the vapor cooling passage is along a neutral bending plane of the radial impeller with the neutral bending plane of the radial impeller passing through a longitudinal axis of a portion of the vapor cooling passage;
an inner chamber in fluid communication with the vapor cooling passage through a plurality of slots formed along the neutral bending plane, wherein the inner chamber is radially inward of the vapor cooling passage so as to provide heat exchange between a gas turbine coolant and the inner chamber.

11. The compressor section according to claim 10, wherein a shaft is supported for rotation by a bearing arranged in a bearing compartment that is sealed by an air seal, a cooling flow path in fluid communication with the air seal to buffer the bearing compartment.

12. The compressor section according to claim 10, further comprising an outer shaft, and an inner shaft disposed within the outer shaft, the inner and outer shafts providing an annular space providing a cooling flow path.

13. The compressor section according to claim 10, further comprising an outer shaft, and an inner shaft disposed within the outer shaft, the inner shaft includes an aperture arranged radially beneath the inner chamber, a cooling flow path extending from within the inner shaft and through the aperture.

14. The compressor section according to claim 10, comprising an axial compressor stage arranged upstream from the radial impeller, and a combustor section and a turbine section arranged downstream from the radial impeller, the axial compressor stage configured to provide a cooling flow to an inner diameter of the radial impeller.

15. The compressor section according to claim 14, wherein the radial impeller is clamped between first and second shaft portions that provide a shaft.

16. The compressor section according to claim 14, wherein the axial compressor stage is in fluid communication with a cooling flow path.

17. The compressor section according to claim 10, wherein the radial impeller has a vane secured to an impeller body, and an outer chamber arranged axially beneath the vane without extending into the vane.

* * * * *